Nov. 5, 1968         R. H. KAUFMANN ET AL         3,408,894
                        BRAIDING APPARATUS
Filed Oct. 2, 1967                              5 Sheets-Sheet 1
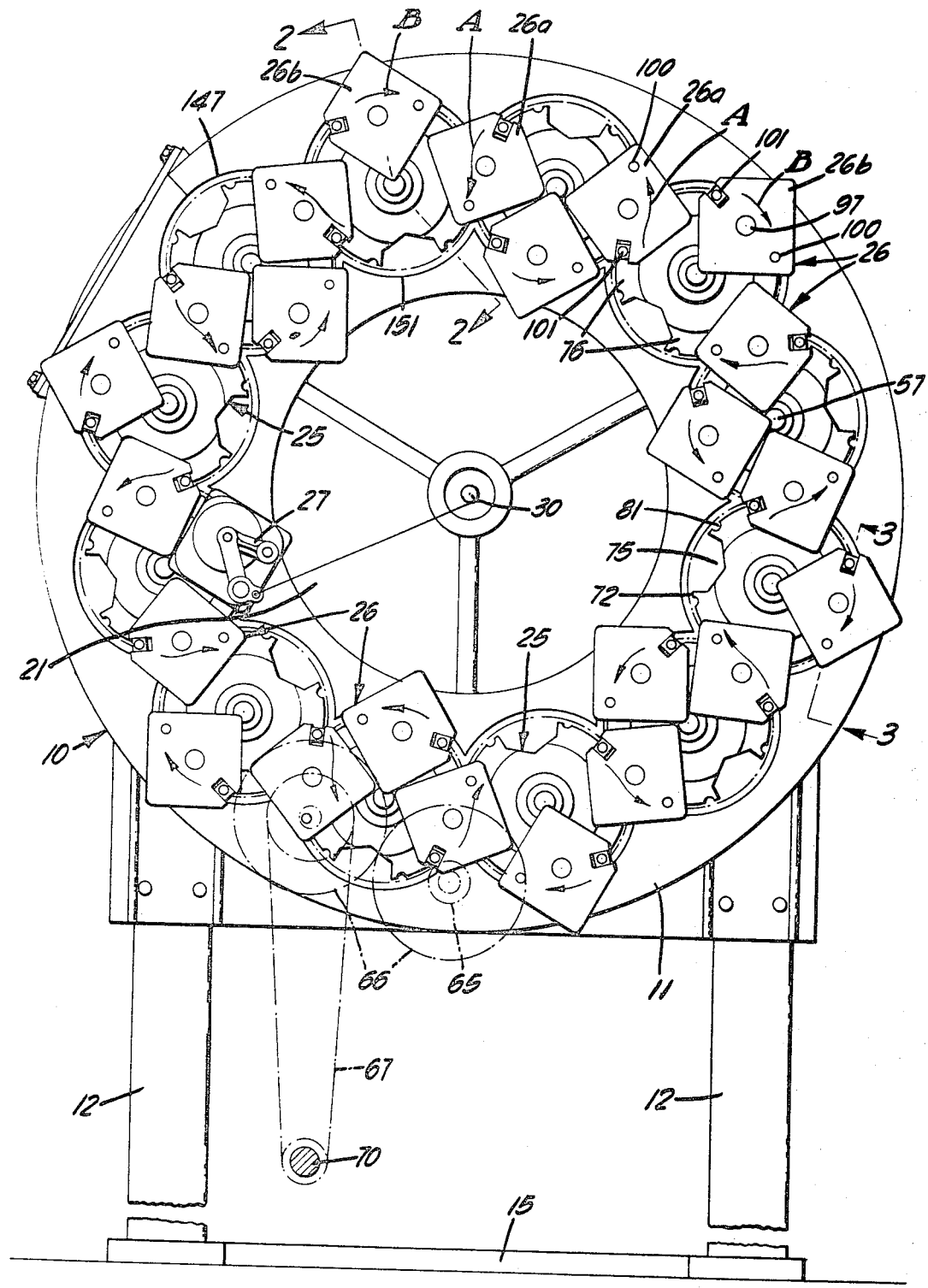

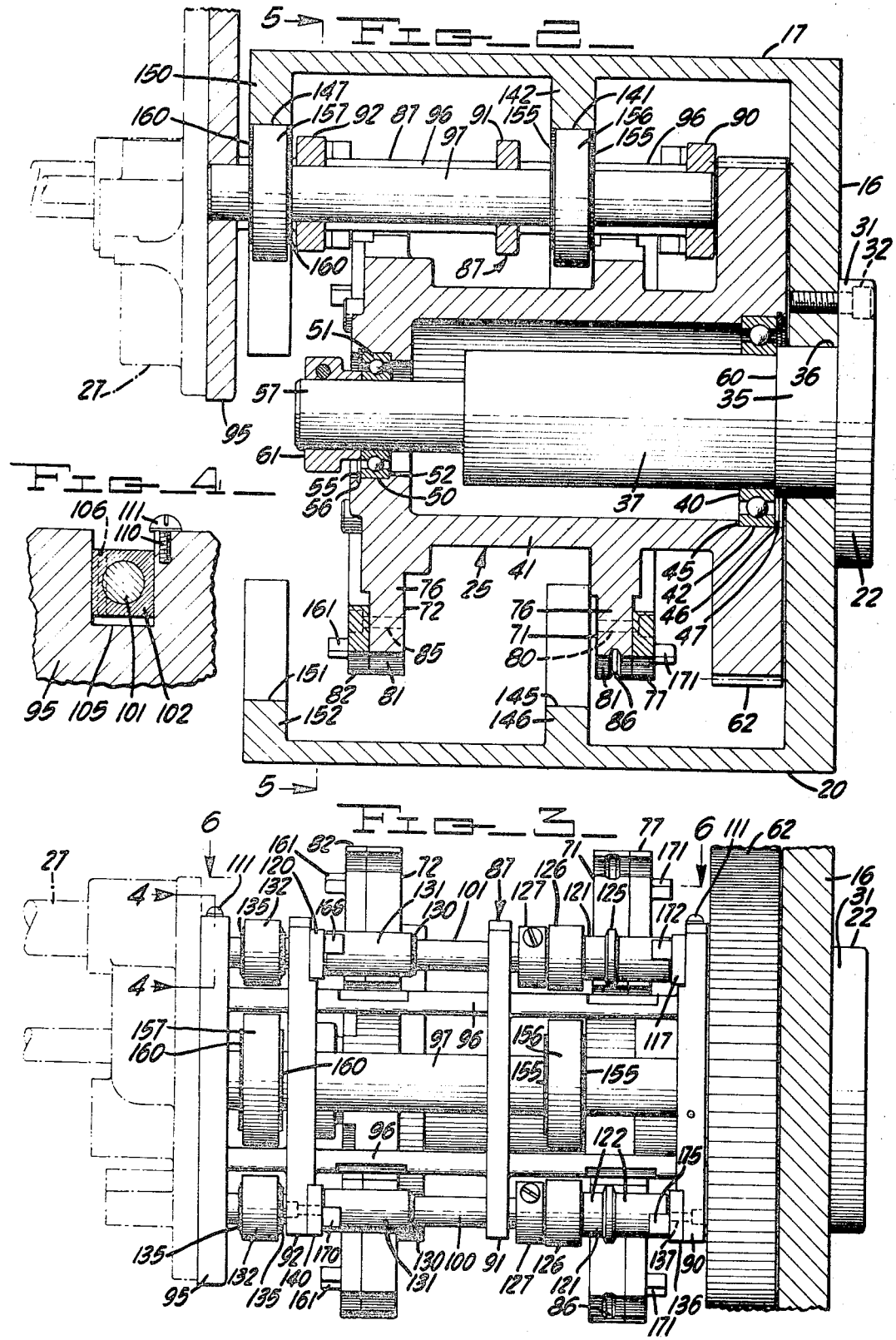

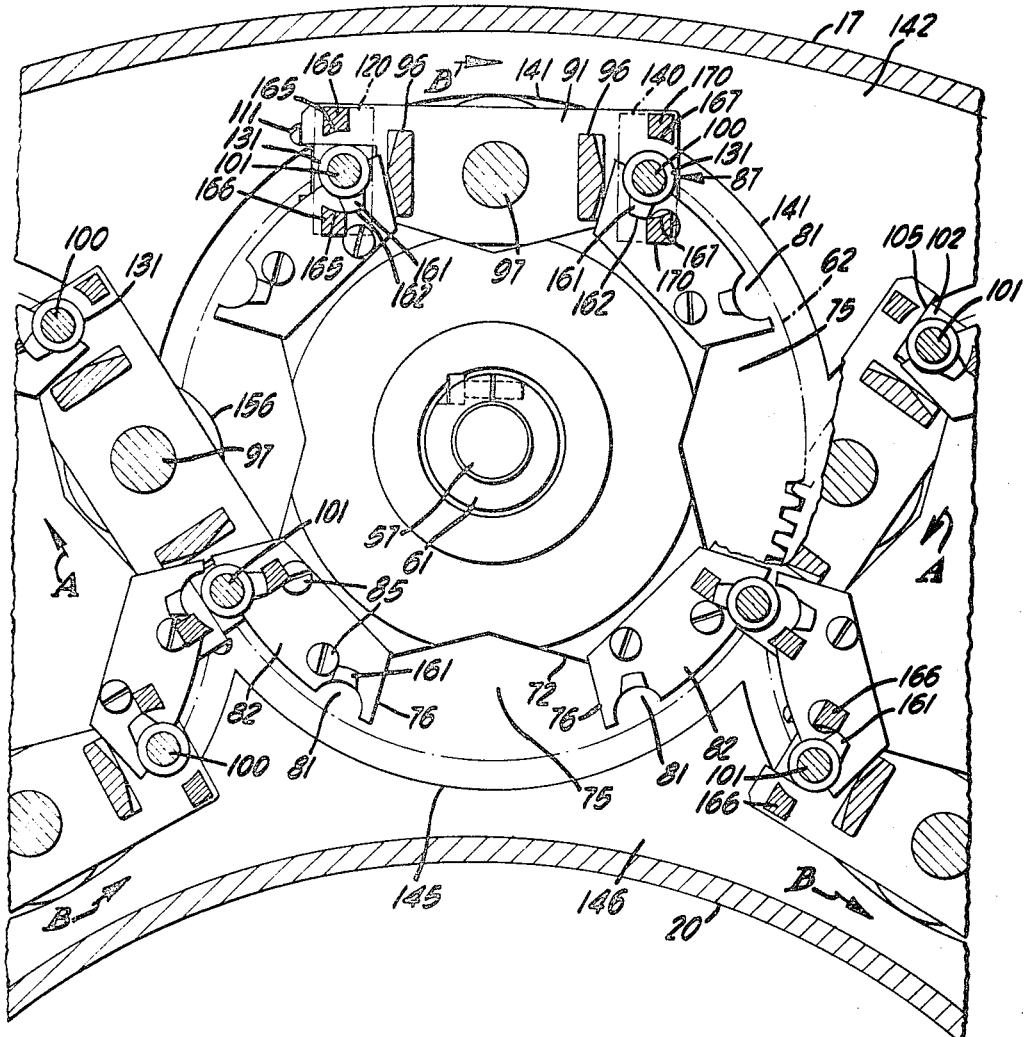
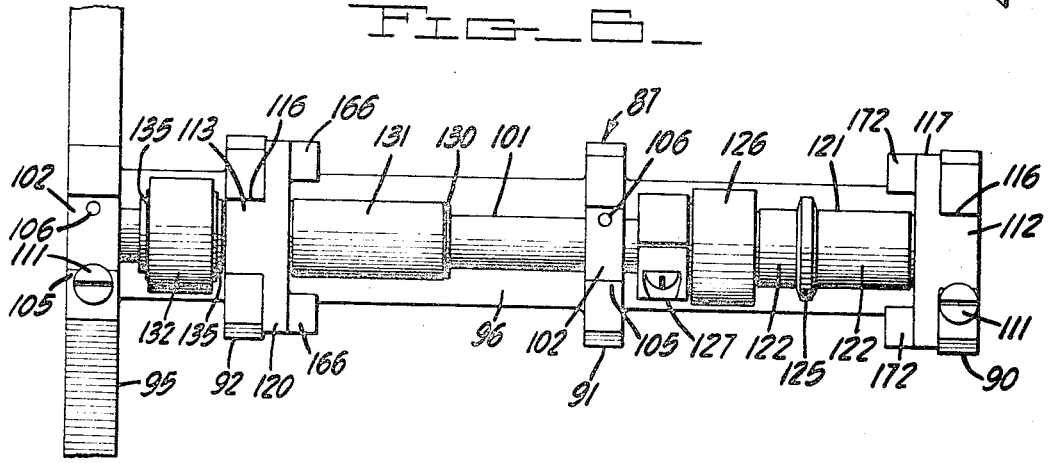

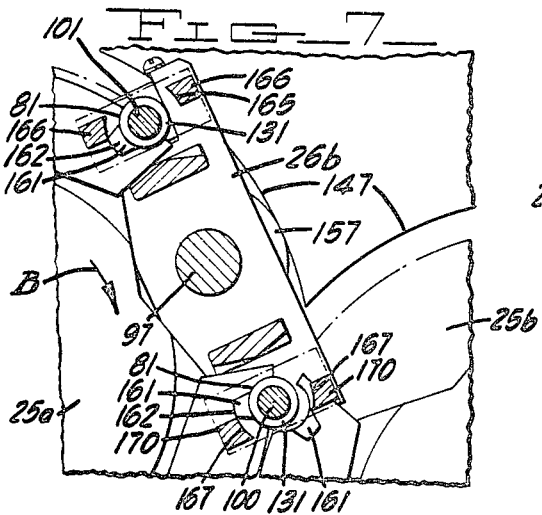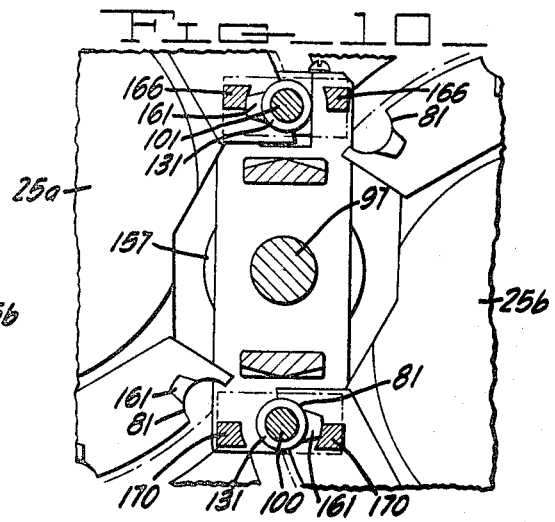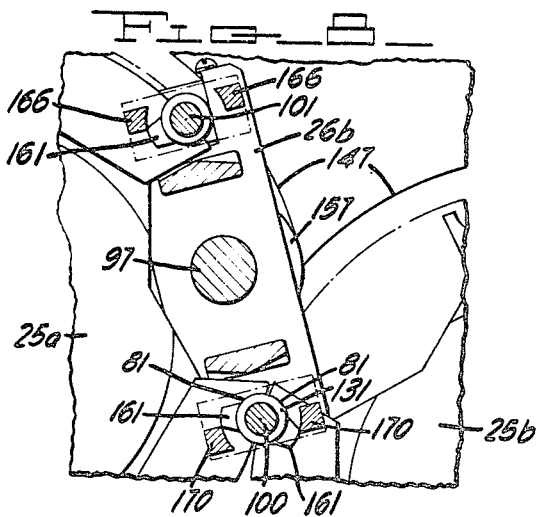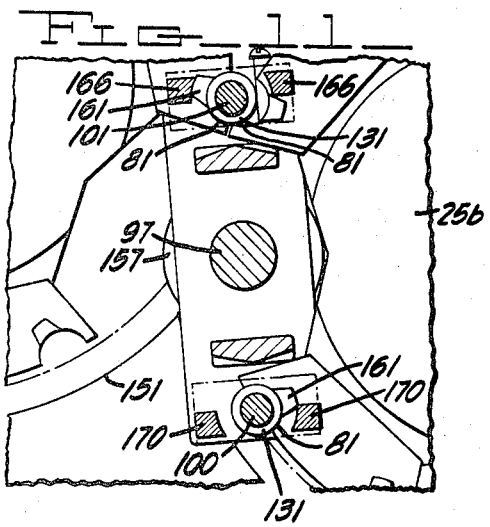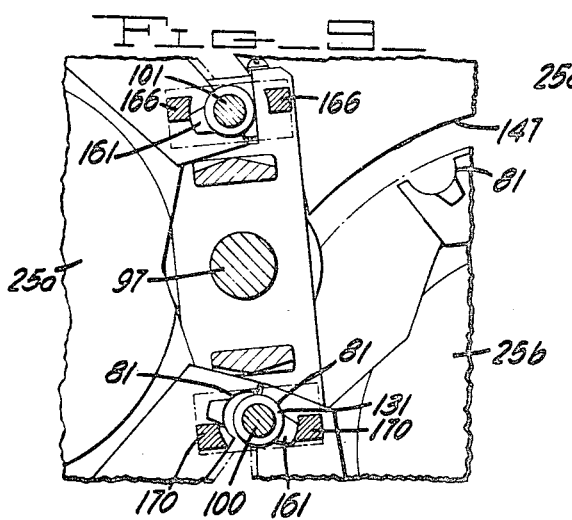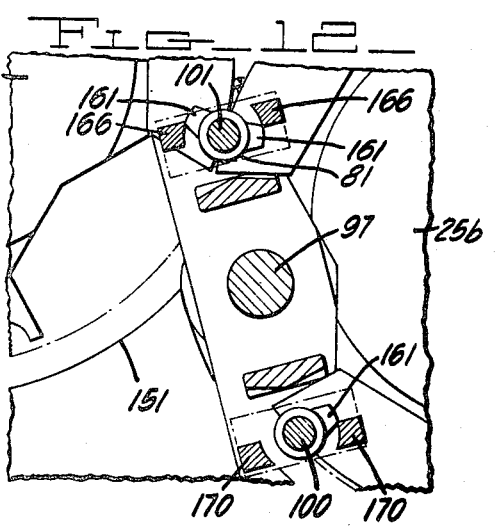

United States Patent Office 3,408,894
Patented Nov. 5, 1968

3,408,894
BRAIDING APPARATUS
Robert H. Kaufmann, Temple, and Jagmohan Singh, Hamburg, Pa., assignors to Textile Machine Works, Wyomissing, Pa., a corporation of Pennsylvania
Filed Oct. 2, 1967, Ser. No. 672,358
8 Claims. (Cl. 87—38)

ABSTRACT OF THE DISCLOSURE

Means for propelling and guiding the strand supply carriers of a braiding machine along sinuous paths in opposite directions about a braiding point including rotors for driving the carriers, and cooperating means on the rotors and carriers for maintaining the carriers in positive driving engagement with the rotors during transfer of the carriers between adjacent rotors.

BACKGROUND OF THE INVENTION

Field of the invention

The invention is directed to means for controlling the high speed movement of strand supply carriers along oppositely directed sinuous paths around the braiding points of braiding machines including shuttle members on which the strand supply carriers are mounted, a circle of rotors adjacent pairs of which are driven in opposite directions, cooperating means on the shuttle members and rotors by means of which the shuttle members are connected to and driven by the rotors, and further cooperating means on the shuttle members and rotors which is operated by the movement of the shuttle members and rotors to maintain positive driving connections between the shuttle members and rotors during transfer of the shuttle members between the adjacent pairs of rotors.

Description of prior art

Heretofore, the most common form of braiding machines for forming tubular braids, or a tubular braided covering for cores, included a deck plate having sinuous intersecting guideways for directing strand carriers in opposite directions around the braiding point, the strand carriers having driving lugs for engagement in slots in oppositely rotating horn gears, upper and lower foot plates for engaging opposite faces of the deck plate and elongated heart pieces connecting the foot plates and interfitting in the guideways. The guideways were arranged to coact with the heart pieces to maintain the carriers in predetermined relationship to the braiding point and to cause the transfer of the driving lugs from a slot in one horn gear to a slot in the adjacent horn gear generally as disclosed in U.S. Patent No. 1,801,134 issued April 14, 1931.

U.S. Patent No. 695,601 shows another but less conventional form of braiding machine having means for positively connecting the strand carriers to driving rotors or horn gears. In this patent the strand carriers are provided with a single lug for engagement in notches in the rotors and each carrier has pairs of pins, one at each side of the lug, for cooperation with rollers on the rotors to maintain the lugs in the notches in the rotors. Associated with each notch is a pair of control rods, one rod engaging the leading side of the pin at one side of the lug and the other rod engaging the trailing edge of the carrier at the same side of the lug. During movement of a carrier with one rotor, the control rods position the carrier so that a pin on the carrier at one side of the lug cooperates with a roller on this rotor to maintain the driving lug in the notch thereof. When the notches in an adjacent pair of rotors meet, the pair of control rods of the first rotor are moved to inactive positions by cams and the control rods of the second rotor act to rotate the carrier to disengage the pin on the carrier and roller on the first rotor and to engage the pin on the carrier at the other side of the lug with the roller on the adjacent rotor to hold the driving lug in the notch of the latter rotor.

In both forms of the prior machines namely those having carriers with heart pieces and lug type guiding and driving means and those having carriers and driving rotors with cooperating means to maintain the carriers in engagement with the driving notches of the rotors, the centrifugal forces developed as the drive of the carriers was transferred between the adjacent horn gears or rotors caused the carriers to twist and resulted in excessive wear between the coacting parts which greatly limited the speed of operation of the machine.

More recently a braiding machine was developed, of the type disclosed in the application of Marcus R. Florentine and Donald Richardson, Ser. No. 630,916, filed Apr. 14, 1967, now U.S. Patent No. 3,363,502, assigned to the assignee of the instant application, which includes a housing, rotors in the housing adapted to be rotated in opposite directions, shuttle members for the strand supplies having first rollers for engaging in pairs of notches in the rotors, second and third rollers on the shuttle members cooperating with surfaces on the housing to maintain the first rollers in engagement with the pairs of notches in the individual rotors, fourth rollers on the shuttle members and cam means associated with the rotors, the second and third rollers cooperating with surfaces in the housing to maintain the first rollers in engagement with the pairs of notches in the rotors, and the second and third rollers cooperating with the surfaces in the housing and the fourth roller cooperating with the cam means to transfer the first rollers on the shuttle members from a pair of notches in one rotor to a pair of notches in an adjacent rotor. The instant application is directed to an improvement to the machine of said application Ser. No. 630,916, now U.S. Patent No. 3,363,502.

SUMMARY OF THE INVENTION

Briefly summarized the invention resides in the provision of means in a braiding machine for moving strand supply carriers in oppositely directed intersecting sinuous paths said means including rotors, shuttle members on which the carriers are mounted, driving connections on the shuttle members and rotors by means of which the shuttle members are driven by the rotors, and cooperating means on the shuttle members and rotors whereby the driving connections on the shuttle members are positively transferred from the driving connections on one rotor to the driving connections on an adjacent rotor by the movement of the shuttle members and rotors.

Brief description of drawings

FIG. 1 is a plan view of the braiding deck of a horizontal braiding machine having mechanism according to the invention incorporated therein;

FIG. 2 is a sectional view on an enlarged scale taken substantially along the line and in the direction of the arrows 2—2 of FIG. 1;

FIG. 3 is a view on an enlarged scale of the strand carrier supporting and driving means therefor taken in the direction of the arrows 3—3 of FIG. 1;

FIG. 4 is a sectional view on an enlarged scale taken on the line and in the direction of the arrows 4—4 of FIG. 3;

FIG. 5 is a sectional view taken substantially along the line and in the direction of the arrows 5—5 of FIG. 2;

FIG. 6 is a view on an enlarged scale taken in the direction of the arrows 6—6 of FIG. 3;

FIGS. 7 to 12 are views showing certain of the parts of one of the carrier supporting and driving means in different operating positions.

Figure 13:
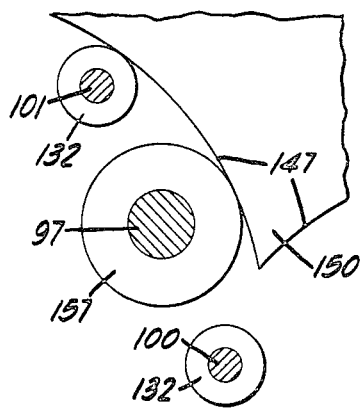
FIGS. 13 to 18 are views of other parts of the carrier supporting and driving means in different operating positions corresponding to the operating positions of FIGS. 7 to 12.
Figure 15:
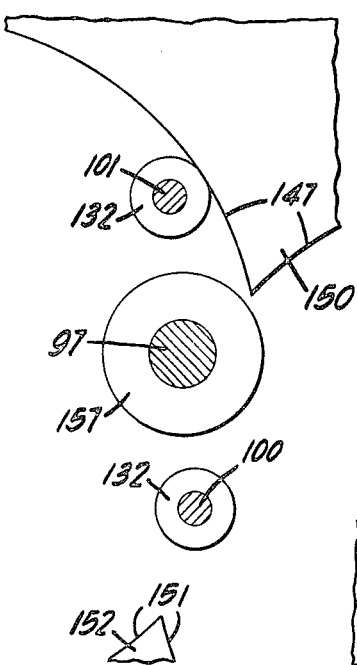

Referring to the drawings there is shown a brading head or deck 10 of a horizontal type brading machine for forming braided covering on high pressure tubular hose and the like including an annular housing 11 secured to the supported legs 12 on a base member 15 (FIG. 1). The housing 11 has a rear wall 16, an outer wall 17, and an inner wall 20 (FIG. 2) the latter defining an inner cylindrical opening 21 through which the hose passes from other similar brading heads or other heads or stations at which other operations are performed in forming the hose.

Mounted in the rear wall 16 on a circular center line concentric with the axial center of the housing is a series of like bearing members 22 for rotatably supporting a like series of rotors 25 for driving shuttle members 26, each of which suports a strand supply carrier diagrammatically shown at 27 in FIGS. 1, 2 and 3, along intersecting sinuous paths in opposite directions around a braiding point 30, in a manner to be hereinafter set forth. Each of the bearing members 22 has a flange 31 secured to the outer face of wall 16 by bolts 32, a bearing portion 35 interfitting a bore 36 in the wall 16 and a bearing portion 37 of reduced diameter for mounting an inner race of a ball bearing 40.

Each of the rotors 25 comprises a tubular member 41 one end of which has a bore 42 for receiving the outer race of bearing 40. The outer race of bearing 40 is retained in the bore 42 between a shoulder 45 in the member 41 and a C-ring 46 carried in a groove 47 in the member. The other end of each of the members 41, remote from the bearing 40 is provided with a bore 50 for receiving an outer race of a ball bearing 51, the outer race being retained in the bore between a shoulder 52 and a C-ring 55 carried in a groove 56 in the member. The inner race of the bearing 51 is carried on a reduced end portion 57 of the bearing member 22. The member 41 is retained against axial movement on the bearing member 22 between a shoulder 60 on the bearing member and a collar 61 secured to the portion 57 of the bearing member for engagement with the inner race of the bearing 51.

The member 41 is provided with a gear portion 62 for meshing engagement with the gear portions of next adjacent rotors whereby alternate rotors of the series will be caused to rotate in a direction opposite to the intervening rotors for purposes hereinafter set forth. The rotors 25 of the series are rotated by a gear 65 meshing with the gear portion 62 of one of the rotors, the gear 65 being driven in turn by gears 66 and a chain or belt 67 from a drive shaft 70 as diagrammatically shown in FIG. 1. The member 41 is also provided with spaced flanges 71 and 72, each flange having recesses 75 alternating with portions 76, as shown in FIG. 5. Each of the portions 76 of the flange 71 has a plate 77 secured thereto by screws 80 (FIG. 2) with the portion and plate having a spaced pair of semicircular notches 81. The portions 76 of the flange 72 each has a plate 82 secured thereto by screws 85 with the portions and plates of flange 72 each having semicircular notches 81 aligned with the notches 81 in the portions 76 and plates 77 of flange 71. Each of the notches 81 in the portions 76 of flange 71 is also provided with an annular groove 86 for purposes hereinafter set forth.

The shuttle members 26 each include a frame 87 (FIGS. 1, 2, 3, 5 and 6) having members 90, 91 and 92 and a support member 95, on which the strand supply carrier 27 is mounted, which are joined to each other by transversely extending ribs 96. Mounted in bearing holes in the members 90, 91, 92 and 95 intermediate the ribs 96 is a center shaft 97, and an end shaft 100 also mounted in bearing holes in the members at one side of the center of shaft 97. A second end shaft 101 is mounted in bearing blocks 102 slidably carried in open end slots 105 in the members 91 and 95 (FIGS. 4 and 6) at the other side of the center of the shaft 97 namely the side remote from the shaft 100. The shaft 101 and blocks 102, which are secured to each other by pins 106, are adapted to be moved radially toward and away from the shaft 97 in the slots 105, in the manner and for the purposes hereinafter set forth. The shaft 101 is also mounted in bearing blocks 112 and 113 slidably mounted in open bearing slots 116 in the members 90 and 92, respectively, for radial movement with the shaft 101, the block 112 having a transversely extending plate portion 117 in sliding engagement with the side of the member 90 facing member 92 and the block 113 having a similar plate portion 120 in sliding engagement with the side of member 92 facing member 90 (FIGS. 3 and 6). Screws 110 threaded into the member 95 at one side of the slot 105 and into the member 90 at one side of the slot 116 have portions 111 overlying the outer end of the slots to limit the radial movement of the shaft 101 and blocks 102, 112 and 113 in their associated slots away from the shaft 97.

Intermediate the plate portion 117 of the block 112 in the member 90 and the member 91 the shaft carries a member or roller 121 having portions 122 for interfitting engagement with the semicircular notches 81 in the flange 71 and plates 77 on the rotors 25 and an intermediate enlarged portion 125 interfitting the annular groove 86 in the portions 76 to prevent axial movement of the shuttle members relative to the rotors when the shuttle members are operatively connected to the rotors. Also rotatably mounted on the shaft 101 is a member or roller 126, for purposes hereinafter set forth, and a collar 127 secured to the shaft, the collar acting to maintain the plate portion 117, and the rollers 121 and 126 in abutting relationship and to limit axial movement of the shaft 101 in the direction of the member 90. Mounted on the shaft 101, between the plate portion 120 of block 113 and a C-ring 130 carried in a groove in the shaft, is a member or roller 131 for interfitting engagement in the semicircular notches 81 in the flange 72 and plates 82 on the rotors 25, the C-ring 130 acting to maintain the plate portion 120 and roller 131 in abutting relationship and to limit the axial movement of the shaft 101 toward the member 92. A member or roller 132, of the same diameter as roller 126, is also mounted on the shaft 101 between C-rings 135 carried in grooves in the shaft intermediate the members 92 and 95.

The shaft 100 is also provided with members or rollers 121 and 126 (FIG. 3) which are mounted on the shaft between a plate 136 secured by screws 137 to the member 90 and a collar 127 secured to the shaft, with the collar acting to maintain the plate and rollers in abutting relationship to limit axial movement of the shaft in the direction of the member 90. The shaft 100 is also provided with a member or roller 131 which is mounted on the shaft between a plate 140 secured to the member 92 and a C-ring 130 carried in a groove in the shaft, with the C-ring acting to maintain the roller 131 in abutting relationship with the plate 140 and to limit axial movement of the shaft toward the member 92. A member or roller 132 is also mounted on the shaft 100 between C-rings 135 carried in grooves in the shaft intermediate the members 92 and 95.

The rollers 126 on the shafts 100 and 101 are adapted to engage outer guide surfaces 141 concentric to the center of each rotor 25 and defined by a flange 142 extending inwardly of the wall 17 of the housing 11, and similar inner guide surfaces 145, having the same radius as surfaces 141, defined by a flange 146 extending inwardly of the inner wall 20 of the housing (FIG. 2). The rollers 132 on the shafts 100 and 101 are also adapted to engage outer guide surfaces 147, aligned with and having the same radius as surfaces 141, defined by a flange 150 extending inwardly of the wall 17 of housing 11 and inner guide surfaces 151, aligned with and having the same radius as surfaces 145, defined by a flange 152 extending inwardly of the wall 20 of the housing. Rotatably mounted on the shaft 97 of each shuttle member 26, between C-rings 155 carried in grooves in the shaft, is a roller 156 also adapted to engage the surfaces 141 and 145 defined by the flanges 142 and 146, respectively. A roller 157 also rotatably mounted on the shaft between C-rings 160 is adapted to engage the surfaces 147 and 151 defined by the flanges 150 and 152, respectively. The plates 82 on the flange 72 of each rotor 25 are provided with projecting lugs 161 one of which is associated with each of the notches 81. Each lug 161 has a surface 162 concentric to the center of the notches for engagement with surfaces 165 on a pair of lugs 166 projecting from the plate portion 120 on the block 113 at opposite sides of the shaft 101 of each shuttle member 26 and also for engagement with surfaces 167 on a pair of lugs 170 projecting from the plate 140 at opposite sides of the shaft 100 of each of the shuttle members (FIGS. 2 and 5), for purposes hereinafter set forth. The plates 77 on the flange 71 of each rotor likewise have projecting lugs 171, similar to the lugs 161 on the plates 82, a lug 171 being associated with each notch 81. Each of the lugs 171 has a surface corresponding to the surface 162 on the lugs 161 for engagement with cooperating surfaces on a pair of lugs 172 on the plate portion 117 of the block 112 and also for engagement with a pair of lugs 175 on the plate 136 on each of the shuttle members 26.

In operation one group of shuttle members identified as 26a are driven in a counterclockwise direction as indicated by the arrows A and a second group of shuttle members identified as 26b are driven in a clockwise direction as indicated by the arrows B (FIG. 1). The shuttle members 26a and 26b are arranged so that the shafts 100 are in leading positions with the rollers 121 and 131 thereon engaged in notches 81 in the portions 76 and associated plates of the flanges 71 and 72, respectively, adjacent one side of the recesses 75 in the flanges, and the shafts 101 are in trailing positions with the rollers 121 and 131 thereon engaged in the notches 81 in the portions 76 and associated plates of the flanges adjacent the other side of recesses 75. During movement of the shuttle members 26a and 26b with the individual rotors, rollers 126, 156 and 132, 157 alternately engage the outer and inner surfaces 141, 145 and 147, 151, respectively, to maintain the rollers 121 and 131 in engagement with the notches 81 in the rotors. Also at this time the rollers 121 and 131 are maintained in engagement with the notches 81 as the rollers 126, 156, and 132, 157 move out of engagement with the surfaces 141, 145 and 147, 151 during transfer of the shuttle members from one rotor to another as hereinafter set forth.

In the following detailed description of the operation of one of the shuttle members only the rollers 132 and 157 associated with the surfaces 147 and 151 in the housing 11 and the rollers 131 and lugs associated with the flanges 72 on the rotors will be referred to although it will be obvious that the rollers and parts associated with the surfaces 141 and 145 in the housing and the flanges 71 on the rotors function simultaneously in the same manner.

Figure 14:
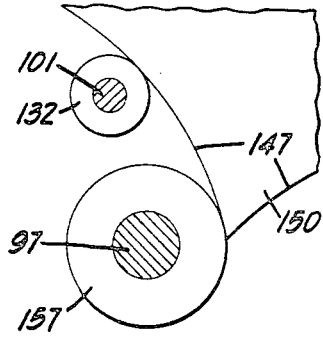

As shown in FIGS. 7 to 18, during movement of a shuttle member 26b in the clockwise direction B, after the roller 132 at the leading end of the shuttle member passes the end of the outer surface 147 associated with a rotor indicated at 25a, engagement of the roller 132 at the trailing end of the shuttle member, and engagement of the roller 157 on the shuttle member with the surface 147 continues to maintain the leading roller 131 in engagement with the notch 81 in the rotor 25a (FIGS. 7 and 13). At this time the lugs 170 on the leading end of the shuttle member are out of engagement with the lugs 161 and the lugs 166 on the trailing end of the shuttle member are out of engagement with the lug 161 on the rotor 25a, as shown in FIG. 7. As the rotors continue to rotate the notches 81 in the rotor 25a and the adjacent rotor indicated at 25b converge and meet with the leading roller 131 of the shuttle member 26b confined in the notches 81 of the adjacent rotors (FIG. 8). At this time the roller 132 at the trailing end of the shuttle member and the roller 157 on the shuttle member continue to engage the surface 147 associated with the rotor 25a and the lugs on both the leading and trailing ends of the shuttle member remain out of engagement with the lugs on the adjacent rotors, as shown in FIGS. 8 and 14.

Figure 16:
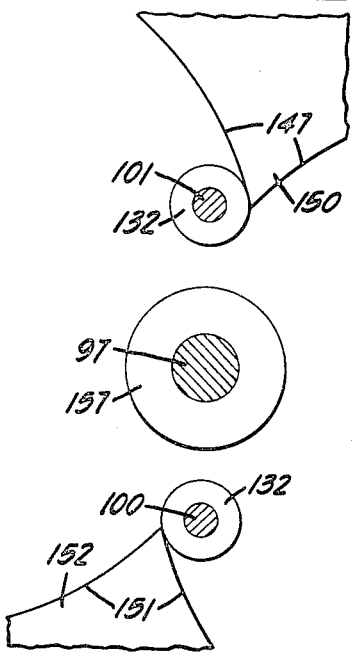
Figure 18:
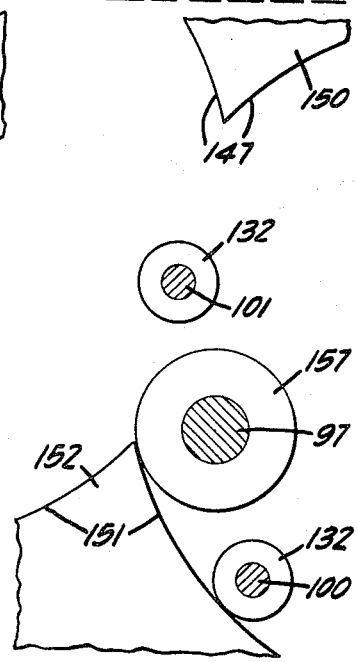

Upon continued movement of the shuttle member with the rotors and before the roller 157 moves out of engagement with the surface 147 associated with the rotor 25a the position of the shuttle member is such as to cause engagement of the lug 161 on the rotor 25b with a lug 170 on the leading end of the shuttle member to lock the roller 131 in the notch 81 in the rotor 25b. Thereafter as the roller 157 moves out of engagement with the surface 147 associated with the rotor 25a to the position of FIGS. 9 and 15, engagement of the lugs 161 and 170 maintains the leading roller 131 in the notch 81 in the rotor 25b while continued engagement of the trailing roller 132 with the surface 147 maintains the trailing roller 131 in the notch 81 in the rotor 25a. Also it will be noted in FIG. 9 that the distance between the notches 81 in the rotors 25a and 25b has increased slightly to cause a slight movement of shaft 101 in the shuttle member away from the shaft 100 and partial engagement of the lug 161 on the rotor 25a with a lug 166 on the trailing end of the shuttle member. As the rotors continue to rotate to move the shuttle member the leading roller 132 on the shuttle member engages the inner surface 151 associated with the rotor 25b while the roller 132 at the trailing end of the shuttle member is still in engagement with the outer surface 147 associated with the rotor 25a as shown in FIGS. 10 and 16. At this time the lug 161 on the rotor 25b is still in engagement with the lug 170 on the leading end of the shuttle member to hold the leading roller 131 in the notch 81 in the rotor 25b, the shaft 101 on the trailing end of the shuttle member has moved farther from the shaft 100 to compensate for the increased distance between the notches 81 on the rotors 25a and 25b, and the lug 166 on the trailing end of the shuttle member 26b is in engagement with a lug 161 to hold the trailing roller 131 in the notch 81 in the rotor 25a (FIG. 10).

Figure 17:
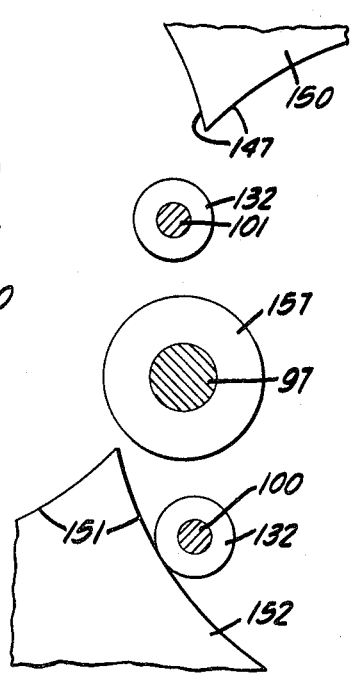

As the rotors continue to rotate to move the shuttle member the leading roller 132 remains in engagement with the surface 151, to maintain the roller 131 at the leading end of the shuttle member in engagement with the notch 81 in the rotor 25b and the lug 161 on the rotor 25b has moved out of engagement with the lug 170 on the shuttle member 26b (FIGS. 11 and 17). At this time the roller 157 and the trailing roller 132 are out of engagement with the surface 147 associated with the rotor 25a and the lug 161 on the rotor 25a is in engagement with a lug 166 at the trailing end of the shuttle member to maintain the roller 131 in engagement with the notch 81 in the rotor 25a. During continued movement of the shuttle member with the rotors the notches 81 in the rotors 25a and 25b converge and meet to confine the trailing roller 131 between the two rotors, and the leading roller 132 and the roller 157 on the shuttle member are in engagement with the surface 151 associated with the rotor 25b (FIGS. 12 and 18) to hold the leading roller 131 in engagement with the notch 81 in the rotor 25b and to maintain the trailing roller 131 in engagement with the notch 81 in the rotor 25b as the notches in the two rotors diverge. At this time the lugs 161 on the rotors 25a and 25b are disengaged from the lugs 170 and 166 at the leading and trailing ends of the shuttle member 26b, respectively.

It is believed to be obvious from the foregoing that the cooperation of the leading and trailing rollers 132 and the rollers 157 with the surfaces 147 and 151 and the cooperation between the lugs 161 on the adjacent rotors and the lugs 170 and 166 at the leading and trailing ends, respectively, of the shuttle members 26b maintain the shuttle members 26b in positive driving engagement with the rotors to effect the smooth transfer of these shuttle members between the adjacent rotors. Also it is believed to be obvious that cooperation between the various rollers on the shuttle members 26a which are driven in the direction A and the cooperation of the lugs on the shuttle members 26a and the rotors maintain these shuttle members in driving engagement with the rotors to effect the transfer of the shuttle members 26a between the adjacent rotors in the same manner as shuttle members 26b.

It will be understood that the improvements specifically shown and described by which the above results are obtained can be changed and modified in various ways without departing from the invention herein disclosed and hereinafter claimed.

We claim:

1. In a braiding machine having strand supply carriers comprising shuttle members adapted to be moved along intersecting sinuous paths in opposite directions around a braiding point, a housing, a circular series of rotors mounted in said housing, means whereby adjacent ones of said rotors are adapted to be rotated in opposite directions, and means for moving said shuttle members along said intersecting paths in opposite directions including spaced pairs of notches in said rotors, first members on said shuttle members for engagement in said pairs of notches in said rotors, a second member associated with each of said first members on each of said shuttle members, a third member on each of said shuttle members, and outer and inner concentric surfaces on said housing associated with each of said rotors, said second and third members cooperating with said outer and inner concentric surfaces to maintain said first members on said shuttle members in engagement with said pairs of notches in each of said rotors, the improvement comprising a first means on said rotors associated with each of said notches of said pairs in said rotors, and second means on said shuttle members associated with said first members on said shuttle members, said second and third members cooperating with said concentric surfaces and said first means on said rotors cooperating with said second means on said shuttle members to transfer said first members on said shuttle members from one of said pairs of notches in one of said adjacent rotors to one of said pair of notches in the other of said adjacent rotors.

2. A machine according to claim 1 in which there is a shaft on which each of said first members and an associated second member are mounted, and there is means for mounting one of said shafts in said shuttle member for movement toward and away from the other of said shafts.

3. A machine according to claim 2 in which there is means for mounting said second means on said one shaft for movement with said first and second members thereon.

4. A machine according to claim 1 in which said pairs of notches are formed in first and second flanges on each of said rotors, and there is first and second pairs of said first members on each of said shuttle members for engaging said pairs of notches in said first and second flanges, a second pair of said second members associated with each pair of said first members, a third member associated with each of said second members, outer and inner concentric surfaces in said housing cooperating with each of said pairs of said second rollers and said third member associated therewith, first and second shafts on which said pairs of first members and a pair of said second members associated therewith are mounted, and means for mounting one of said shafts in said shuttle member for movement toward and away from the other of said shafts.

5. In a machine according to claim 4 in which there is a first means on said rotors associated with each of notches of said pairs in said first and second flanges, and second means on said shuttle members associated with each of said first members of said first and second pairs for cooperation with said first means.

6. In a machine according to claim 5 in which there is means for mounting said second means on said one shaft for movement with said one shaft and said first and second members thereon.

7. In a machine according to claim 4 in which said first pair of said first members and said second members associated therewith are in leading position and said second pair of said first members and said second members associated therewith are in trailing positions in said shuttle members during movement of said shuttle members in oppose directions, and there is a first shaft on which said first and second members in leading positions are mounted, a second shaft on which said first and second members in said trailing positions are mounted, and means for mounting said second shaft in said shuttle member for movement toward and away from said first shaft.

8. A machine according to claim 4 in which there is an annular groove associated with each of said notches of said pairs in one of said flanges, and said pair of first members engaging said pairs of notches in said one flange each have a portion interfitting said annular grooves associated with said notches, said annular grooves of said notches and said portions of said first members acting to fix the axial positions of said shuttle members relative to said rotors.

References Cited

UNITED STATES PATENTS

| 898,939 | 9/1908 | Thun _____ 87—37 |
| 1,165,361 | 12/1915 | Pegg _____ 87—38 |
| 1,356,570 | 10/1920 | Turney _____ 87—38 XR |
| 1,358,173 | 11/1920 | Penso et al. _____ 87—38 XR |
| 3,363,502 | 1/1968 | Florentine et al. _____ 87—38 |

JOHN PETRAKES, *Primary Examiner.*